US009404531B2

(12) United States Patent
Maeda et al.

(10) Patent No.: US 9,404,531 B2
(45) Date of Patent: Aug. 2, 2016

(54) BEARING APPARATUS FOR WHEEL

(75) Inventors: Kikuo Maeda, Kuwana (JP); Hisashi Ohtsuki, Iwata (JP)

(73) Assignee: NTN CORPORATION, Osaka (JP)

( * ) Notice: Subject to any disclaimer, the term of this patent is extended or adjusted under 35 U.S.C. 154(b) by 2050 days.

(21) Appl. No.: 11/878,678

(22) Filed: Jul. 26, 2007

(65) Prior Publication Data

US 2008/0205810 A1 Aug. 28, 2008

(30) Foreign Application Priority Data

Feb. 23, 2007 (JP) ................................. 2007-043753
Feb. 23, 2007 (JP) ................................. 2007-043754
Feb. 23, 2007 (JP) ................................. 2007-043755
Feb. 23, 2007 (JP) ................................. 2007-043756

(51) Int. Cl.
| F16C 13/00 | (2006.01) |
| F16C 19/38 | (2006.01) |
| B60B 27/00 | (2006.01) |
| F16C 33/64 | (2006.01) |
| F16C 35/063 | (2006.01) |

(52) U.S. Cl.
CPC ............. *F16C 19/386* (2013.01); *B60B 27/001* (2013.01); *F16C 33/64* (2013.01); *F16C 35/063* (2013.01)

(58) Field of Classification Search
USPC ........ 384/543, 544, 586, 589, 625; 301/105.1
See application file for complete search history.

(56) References Cited

U.S. PATENT DOCUMENTS

| 3,477,884 | A | 11/1969 | Schlicht |
| 6,051,082 | A | 4/2000 | Okita et al. |
| 6,422,758 | B1 | 7/2002 | Miyazaki et al. |
| 6,478,471 | B2* | 11/2002 | Ishida et al. ................... 384/537 |
| 6,739,977 | B2* | 5/2004 | Ogura et al. ................... 464/178 |
| 6,749,517 | B2* | 6/2004 | Ouchi ........................... 384/544 |
| 2001/0020329 | A1* | 9/2001 | Webb et al. ................. 29/898.07 |
| 2003/0103705 | A1 | 6/2003 | Miyazaki et al. |
| 2004/0252924 | A1* | 12/2004 | Kiuchi et al. ................. 384/492 |
| 2004/0252927 | A1 | 12/2004 | Hirai et al. |
| 2005/0141798 | A1* | 6/2005 | Okasaka ....................... 384/544 |
| 2005/0141799 | A1 | 6/2005 | Uyama et al. |

(Continued)

FOREIGN PATENT DOCUMENTS

| CN | 1573149 A | 2/2005 |
| DE | 12 92 696 B | 4/1969 |

(Continued)

OTHER PUBLICATIONS

Material datasheet for AISI 1050, www.efunda.com/materials/alloys/carbon_steels.*
Shigley, Joseph E., Mechanical Engineering Design, McGraw-Hall, 7th ed, pp. 72-75 (bottom p. 74).*
Tarr, Martin, Mechanical properties of metals webpage, first published Dec. 2004, p. 5 compression section.*

(Continued)

*Primary Examiner* — James Pilkington
(74) *Attorney, Agent, or Firm* — McDermott Will & Emery LLP

(57) ABSTRACT

A bearing apparatus for wheel with ensured high durability by including a part with improved fatigue strength in a non-hardened portion includes an outer member, an inner member, and a roller. The inner member includes a hub ring made of steel and having a wheel attachment flange formed. The hub ring has a hardened portion hardened to attain at least 50 HRC as a result of quench hardening and a non-hardened portion which is a portion other than the hardened portion. Compressive stress in a range from at least 50 MPa to at most 500 MPa remains in the surface of the non-hardened portion.

8 Claims, 2 Drawing Sheets

(56) References Cited

U.S. PATENT DOCUMENTS

| | | | |
|---|---|---|---|
| 2006/0257063 | A1 | 11/2006 | Shigeoka |
| 2007/0122071 | A1* | 5/2007 | Ohtsuki ..................... 384/589 |

FOREIGN PATENT DOCUMENTS

| | | | |
|---|---|---|---|
| DE | 10 2005 060 113 A1 | 7/2006 | |
| EP | 0854 303 A2 | 7/1998 | |
| EP | 1 312 820 A1 | 5/2003 | |
| EP | 1 479 931 A2 | 11/2004 | |
| EP | 1 486 353 A2 | 12/2004 | |
| EP | 1731777 A1 | 12/2006 | |
| GB | 2 275 509 A | 8/1994 | |
| JP | 06-256965 | 9/1994 | |
| JP | 10-204612 A | 8/1998 | |
| JP | 10-259451 A | 9/1998 | |
| JP | 2002-012919 A | 1/2002 | |
| JP | 2002-087008 | 3/2002 | |
| JP | 2004142733 A | 5/2004 | |
| JP | 2004-257556 A | 9/2004 | |
| JP | 2005-003061 | 1/2005 | |
| JP | 2005-195168 A | 7/2005 | |
| JP | 2006-036112 A | 2/2006 | |
| JP | 2006-046353 A | 2/2006 | |
| JP | 2006-064146 | 3/2006 | |
| JP | 2006-13797 | 6/2006 | |
| JP | 2006-200700 A | 8/2006 | |
| JP | 2006-291250 | 10/2006 | |
| JP | 2006315424 A | 11/2006 | |
| WO | WO 97/37788 | 10/1997 | |
| WO | WO2005/056309 | * | 6/2005 |

OTHER PUBLICATIONS

European Office Action issued in European Patent Application No. EP 07014706.1 dated Feb. 1, 2010.

International Search Report issued in International Patent Application No. PCT/JP2008/52933 dated on May 27, 2008.

European Search Report issued in European Patent Application No. EP 07014706.1, dated on Dec. 27, 2007.

European Office Action issued in European Patent Application No. EP 07 014 706-1-2421, mailed Aug. 27, 2009.

Chinese Grounds for Rejection, w/ English translation thereof, issued in Chinese Patent Application No. CN 200710138472.3 dated Nov. 3, 2010.

European Search Report issued in European Patent Application No. EP 08711722.2 dated Feb. 1, 2011.

European Office Action issued in European Patent Application No. 08711722.2 mailed Sep. 19, 2012.

Japanese Office Action for Application No. 2007-043756 dated Apr. 2, 2013.

Japanese Office Action with English translation issued in Japanese Application No. 2007-043753 dated Jul. 31, 2012.

Japanese Office Action with English translation issued in Japanese Application No. 2007-043754 dated Jul. 31, 2012.

Japanese Office Action with English translation issued in Japanese Application No. 2007-043756 dated Aug. 7, 2012.

Japanese Office Action with English translation issued in Japanese Application No. 2007-043755 dated Jul. 31, 2012.

Japanese Decision to Grant, and English translation thereof, issued in Japanese Patent Application No. 2007-043754 dated Oct. 30, 2012.

* cited by examiner

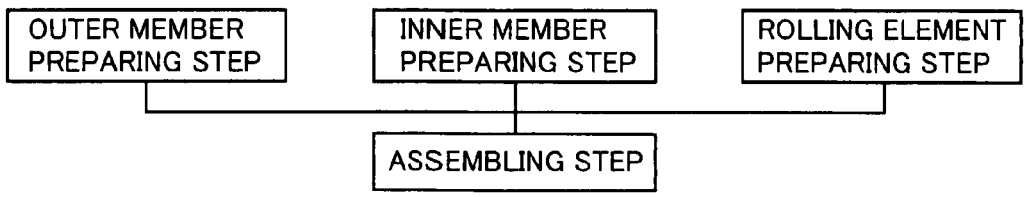
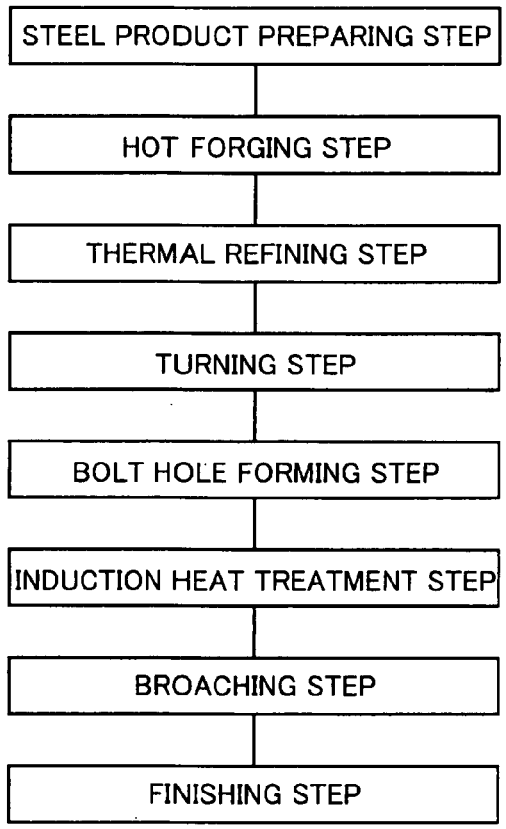
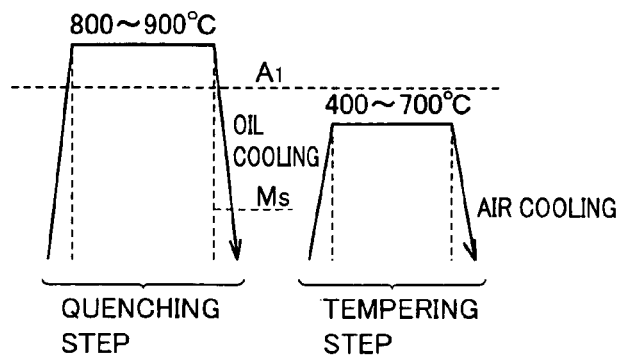

BEARING APPARATUS FOR WHEEL

BACKGROUND OF THE INVENTION

1. Field of the Invention

The present invention relates to a bearing apparatus for wheel, and more particularly to a bearing apparatus for wheel for rotatably supporting the wheel with respect to a car body.

2. Description of the Background Art

Further improvement in fuel efficiency or running stability of a vehicle such as an automobile has been required in recent years. To that end, a bearing apparatus for wheel rotatably supporting the wheel with respect to a car body has been reduced in size and weight. Consequently, parts constituting the bearing apparatus for wheel tend to be made smaller in size and thickness. Meanwhile, with higher output and performance of the vehicle such as an automobile, it is likely that greater load is imposed on the bearing apparatus for wheel. Under such circumstances, further reduction in size or thickness of parts or improvement in durability of the bearing apparatus for wheel has become difficult.

In order to address such difficulty, it has been proposed to form, in the parts constituting the bearing apparatus for wheel, a hardened portion by subjecting a region insufficient in strength to partial hardening treatment by utilizing induction hardening, to thereby ensure strength, in particular, rotating bending fatigue strength or the like, of that region (see, for example, Japanese Patent Laying-Open No. 2002-087008).

Forming of a hardened portion in a region insufficient in strength, however, may give rise to a problem of strength of a non-hardened portion, which is a portion other than the hardened portion, and it is necessary to additionally form hardened portions. Thus, forming of a large number of hardened portions leads to complicated manufacturing step, in particular, heat treatment step, of the bearing apparatus for wheel, and manufacturing cost is increased. In addition, if a thin portion having a small thickness or a region adjacent to the thin portion is subjected to hardening treatment such as induction hardening, another problem of deformation of the thin portion due to heat treatment may arise. Meanwhile, it may be effective to harden the part, of which strength is required, in its entirety, among the parts constituting the bearing apparatus for wheel, to thereby eliminate a non-hardened portion and ensure strength. If the part is formed as the hardened portion in its entirety, however, subsequent working becomes difficult, and it is not necessarily effective to adopt such measures.

SUMMARY OF THE INVENTION

From the foregoing, an object of the present invention is to provide a bearing apparatus for wheel with ensured high durability by including a part with improved fatigue strength in a non-hardened portion.

A bearing apparatus for wheel according to one aspect of the present invention includes: an outer member having multiple rows of annular outer raceway surfaces formed on an inner circumferential surface; an inner member having multiple rows of annular inner raceway surfaces opposing the outer raceway surfaces formed; and a rolling element in contact with the outer raceway surface and the inner raceway surface and arranged on an annular raceway in a freely rolling manner. Any one of the outer member and the inner member includes a flanged member for wheel, that is made of steel and has a wheel attachment flange formed, the wheel attachment flange being a flange for attaching a wheel. In addition, the flanged member for wheel has a hardened portion hardened to attain at least 50 HRC as a result of quench hardening, and a non-hardened portion representing a portion other than the hardened portion. Compressive stress in a range from at least 50 MPa to at most 500 MPa remains in a surface of the non-hardened portion.

A bearing apparatus for wheel according to another aspect of the present invention includes: an outer member having multiple rows of annular outer raceway surfaces formed on an inner circumferential surface; an inner member having multiple rows of annular inner raceway surfaces opposing the outer raceway surfaces formed; and a rolling element in contact with the outer raceway surface and the inner raceway surface and arranged on an annular raceway in a freely rolling manner. Any one of the outer member and the inner member includes a flanged member for wheel, that is made of steel and has a wheel attachment flange formed, the wheel attachment flange being a flange for attaching a wheel. In addition, the flanged member for wheel has a hardened portion hardened to attain at least 50 HRC as a result of quench hardening, and a non-hardened portion representing a portion other than the hardened portion. Content of non-diffusible hydrogen in the steel composing the non-hardened portion is not higher than 0.8 ppm.

A bearing apparatus for wheel according to another aspect of the present invention includes: an outer member having multiple rows of annular outer raceway surfaces formed on an inner circumferential surface; an inner member having multiple rows of annular inner raceway surfaces opposing the outer raceway surfaces formed; and a rolling element in contact with the outer raceway surface and the inner raceway surface and arranged on an annular raceway in a freely rolling manner. Any one of the outer member and the inner member includes a flanged member for wheel, that is made of steel and has a wheel attachment flange formed, the wheel attachment flange being a flange for attaching a wheel. In addition, the flanged member for wheel has a hardened portion hardened to attain at least 50 HRC as a result of quench hardening, and a non-hardened portion representing a portion other than the hardened portion. A ratio of area occupied by carbide in the steel composing the non-hardened portion is not higher than 10%.

A bearing apparatus for wheel according to yet another aspect of the present invention includes: an outer member having multiple rows of annular outer raceway surfaces formed on an inner circumferential surface; an inner member having multiple rows of annular inner raceway surfaces opposing the outer raceway surfaces formed; and a rolling element in contact with the outer raceway surface and the inner raceway surface and arranged on an annular raceway in a freely rolling manner. Any one of the outer member and the inner member includes a flanged member for wheel, that is made of steel and has a wheel attachment flange formed, the wheel attachment flange being a flange for attaching a wheel. In addition, the flanged member for wheel has a hardened portion hardened to attain at least 50 HRC as a result of quench hardening, and a non-hardened portion representing a portion other than the hardened portion. The steel composing the non-hardened portion has austenite grain size of at least No. 8.

In general, in the flanged member for wheel constituting the bearing apparatus for wheel, a measure to form the hardened portion in a portion insufficient in strength is adopted. Such a measure, however, may give rise to a problem of the strength of the non-hardened portion which is a portion other than the hardened portion, and it is necessary to additionally form hardened portions. Considering the problems of manufacturing cost, deformation due to heat treatment, workability, and the like as described above, however, a measure to form a large number of hardened portions or a measure to form the flanged member for wheel as the hardened portion in its entirety is not necessarily effective.

In contrast, according to the bearing apparatus for wheel in one aspect of the present invention, compressive stress in a range from at least 50 MPa to at most 500 MPa remains in the surface of the non-hardened portion of the flanged member for wheel. Accordingly, generation of crack in the surface of the non-hardened portion and subsequent propagation thereof is suppressed, and the fatigue strength of the non-hardened portion is improved. Therefore, even if moment load is repeatedly applied to the wheel attachment flange from the wheels, generation of crack from the non-hardened portion is suppressed and occurrence of fretting damage is suppressed. Consequently, high durability of the bearing apparatus for wheel in one aspect of the present invention is ensured by including the flanged member for wheel with improved fatigue strength in the non-hardened portion.

In addition, according to the bearing apparatus for wheel in another aspect of the present invention, the content of non-diffusible hydrogen in the steel composing the non-hardened portion of the flanged member for wheel is suppressed to 0.8 ppm or lower. Accordingly, presence of hydrogen that may promote generation and propagation of crack is suppressed and the fatigue strength of the non-hardened portion is improved. Consequently, high durability of the bearing apparatus for wheel in another aspect of the present invention is ensured by including the flanged member for wheel with improved fatigue strength in the non-hardened portion.

Moreover, according to the bearing apparatus for wheel in another aspect of the present invention, the ratio of area occupied by carbide in the steel composing the non-hardened portion of the flanged member for wheel is not higher than 10%. Accordingly, the structure of the steel composing the non-hardened portion is homogenous and the fatigue strength of the non-hardened portion is improved. Consequently, high durability of the bearing apparatus for wheel in another aspect of the present invention is ensured by including the flanged member for wheel with improved fatigue strength in the non-hardened portion.

Further, according to the bearing apparatus for wheel in yet another aspect of the present invention, the steel composing the non-hardened portion of the flanged member for wheel has austenite grain size of at least No. 8. Accordingly, the microstructure of the steel is made finer and the fatigue strength of the non-hardened portion is improved. Consequently, high durability of the bearing apparatus for wheel in yet another aspect of the present invention is ensured by including the flanged member for wheel with improved fatigue strength in the non-hardened portion.

In the bearing apparatus for wheel in one aspect of the present invention, preferably, the flanged member for wheel has an insertion hole for insertion of another member formed in a region including a central axis of the raceway of the rolling element, and a sidewall of the insertion hole is included in the non-hardened portion in one aspect of the present invention described above.

In the flanged member for wheel above, an insertion hole for coupling the bearing apparatus for wheel to another member by insertion of such another member as a shaft may be formed. Here, relatively large stress may repeatedly be applied to the surface of the sidewall of the insertion hole. Accordingly, depending on magnitude of the stress, crack may be generated in the surface of the sidewall of the insertion hole and may propagate, which results in failure of the flanged member for wheel. In contrast, the sidewall of the insertion hole is included in the non-hardened portion where compressive stress in a range from at least 50 MPa to at most 500 MPa remains in the surface, so that the fatigue strength around the surface of the sidewall of the insertion hole is improved and failure can be suppressed.

In the bearing apparatus for wheel in another aspect of the present invention, preferably, the flanged member for wheel has an insertion hole for insertion of another member formed in a region including a central axis of the raceway of the rolling element, and a region extending from the surface of the sidewall of the insertion hole by at least 1 mm is formed as the non-hardened portion in another aspect of the present invention described above.

In the flanged member for wheel above, an insertion hole for coupling the bearing apparatus for wheel to another member by insertion of such another member as a shaft may be formed. Here, relatively large stress may repeatedly be applied to the surface of the sidewall of the insertion hole. Accordingly, depending on magnitude of the stress, crack may be generated in the surface of the sidewall of the insertion hole and may propagate, which results in failure of the flanged member for wheel. In contrast, a region extending from the surface of the sidewall of the insertion hole by at least 1 mm is formed as the non-hardened portion where the content of non-diffusible hydrogen is not higher than 0.8 ppm as described above, so that the fatigue strength around the surface of the sidewall of the insertion hole is improved and failure can be suppressed.

In the bearing apparatus for wheel in another aspect of the present invention, preferably, the flanged member for wheel has an insertion hole for insertion of another member formed in a region including a central axis of the raceway of the rolling element, and a region extending from the surface of the sidewall of the insertion hole by at least 1 mm is formed as the non-hardened portion in another aspect of the present invention described above.

In the flanged member for wheel above, an insertion hole for coupling the bearing apparatus for wheel to another member by insertion of such another member as a shaft may be formed. Here, relatively large stress may repeatedly be applied to the surface of the sidewall of the insertion hole. Accordingly, depending on magnitude of the stress, crack may be generated in the surface of the sidewall of the insertion hole and may propagate, which results in failure of the flanged member for wheel. In contrast, a region extending from the surface of the sidewall of the insertion hole by at least 1 mm is formed as the non-hardened portion where the ratio of area occupied by carbide is not higher than 10% as described above, so that the fatigue strength around the surface of the sidewall of the insertion hole is improved and failure can be suppressed.

In the bearing apparatus for wheel in yet another aspect of the present invention, preferably, the flanged member for wheel has an insertion hole for insertion of another member formed in a region including a central axis of the raceway of the rolling element, and a region extending from the surface of the sidewall of the insertion hole by at least 1 mm is formed as the non-hardened portion in another aspect of the present invention described above.

In the flanged member for wheel above, an insertion hole for coupling the bearing apparatus for wheel to another member by insertion of such another member as a shaft may be formed. Here, relatively large stress may repeatedly be applied to the surface of the sidewall of the insertion hole. Accordingly, depending on magnitude of the stress, crack may be generated in the surface of the sidewall of the insertion hole and may propagate, which results in failure of the flanged member for wheel. In contrast, a region extending from the surface of the sidewall of the insertion hole by at least 1 mm is formed as the non-hardened portion having austenite grain size of at least No. 8 as described above, so that the fatigue strength around the surface of the sidewall of the insertion hole is improved and failure can be suppressed.

In the bearing apparatus for wheel above, preferably, a root portion of the wheel attachment flange on a side where the wheel is attached when viewed from the wheel attachment flange has a surface hardness of at most 35 HRC.

Thus, workability in cutting or the like is improved and deformation due to heat treatment can be suppressed, and lowering in surface runout accuracy of a brake rotor attachment surface of the wheel attachment flange caused by deformation due to heat treatment can be prevented.

In the bearing apparatus for wheel above, preferably, the inner member includes a hub ring serving as the flanged member for wheel, and an inner ring fitted into the hub ring. Thus, the inner ring having the inner raceway surface formed and having excellent durability, in particular, rolling contact fatigue life, can be adopted. Consequently, durability of the bearing apparatus for wheel can further be improved.

In the bearing apparatus for wheel above, preferably, an inboard-side end portion representing an end portion of the hub ring opposite to where the wheel is attached when viewed from the wheel attachment flange forms a caulking portion as a result of its plastic deformation in a radially outward direction. The inner ring is fixed to the hub ring in a direction of axis by the caulking portion.

Thus, what is called a self-retaining structure is achieved. Therefore, as it is not necessary to control a pre-load amount by firm fastening by means of a nut or the like as in the conventional example, incorporation in the vehicle can be simplified and the pre-load amount can be maintained for a long time.

In the bearing apparatus for wheel above, preferably, the caulking portion is formed as a result of plastic deformation of the inboard-side end portion having a surface hardness of at most 25 HRC.

Thus, variation in hardness of the caulking portion is suppressed. In addition, as sufficient workability can be ensured, generation of small crack in the surface of the caulking portion due to plastic working can be suppressed and reliability of the bearing apparatus for wheel is improved.

In the bearing apparatus for wheel above, preferably, a pair of inner rings is fitted into the hub ring. Allowance of interference fit between the hub ring and an outboard-side inner ring which is the inner ring closer to the wheel attachment flange out of the pair of inner rings is greater than allowance of interference fit between the hub ring and an inboard-side inner ring which is the inner ring farther from the wheel attachment flange out of the pair of inner rings.

During operation of the bearing apparatus for wheel, receiving force from the wheels, the bearing apparatus for wheel elastically deforms. Magnitude of elastic deformation tends to be greater on the outboard side where the wheel is attached. Accordingly, such a phenomenon that the inner ring fitted in the hub ring slips relative to the hub ring (creep) is more likely on the outboard side. Accordingly, the allowance of interference fit between the outboard-side inner ring and the hub ring is made greater than the allowance of interference fit between the inboard-side inner ring and the hub ring, so that occurrence of creep on the outboard side is suppressed and durability of the bearing apparatus for wheel can be improved. Here, the allowance of interference fit refers to the extent to which the outer diameter of the hub ring in a fitting region where the hub ring and the inner ring are fitted to each other is greater than an inner diameter of the inner ring when the inner ring is fitted to an outer circumferential surface of the hub ring. For example, if the outer diameter of the hub ring is greater than the inner diameter of the inner ring by 10 μm in the fitting region, the allowance of interference fit is set to 10 μm.

Here, for example, the allowance of interference fit between the hub ring and the inner ring of the bearing apparatus for wheel can be measured in the following manner. Initially, the hub ring and the inner ring are separated from each other by pulling out the inner ring from the hub ring. Here, if the inner ring is fixed to the hub ring by means of a bolt or a caulking portion, such a region is removed by cutting or the like, and thereafter the inner ring is pulled out from the hub ring. Thereafter, an outer diameter of the hub ring and an inner diameter of the inner ring in the fitting region are measured at least three locations. The measurement can be conducted by using a measurement apparatus capable of measurement of the order of micron, such as a dial gauge. Then, respective averages of measured outer diameters and inner diameters are calculated, and the allowance of interference fit can be found from the difference therebetween. Here, there is some error between the calculated allowance of interference fit and the proper allowance of interference fit because of pull-out of the inner ring from the hub ring. The error, however, is small enough, relative to the allowance of interference fit, to sufficiently allow determination as to which of the allowance of interference fit between one inner ring and the hub ring and the allowance of interference fit between the other inner ring and the hub ring, out of at least a pair of inner rings, is greater.

In the bearing apparatus for wheel above, preferably, a root portion of the wheel attachment flange opposite to where the wheel is attached when viewed from the wheel attachment flange has a surface hardness in a range from at least 54 HRC to at most 64 HRC.

Thus, sufficient mechanical strength against the rotating bending load applied to the wheel attachment flange can be provided, and strength and durability of the flanged member for wheel are further improved.

In the bearing apparatus for wheel above, preferably, the steel composing the flanged member for wheel is a medium-carbon steel containing carbon in a range from at least 0.40 mass % to at most 0.80 mass %. Thus, ease in forging, ease in cutting, ease in heat treatment, or cost efficiency is improved, and the flanged member for wheel is particularly suitable for partial quench hardening using induction hardening.

As can clearly be understood from the description above, according to the bearing apparatus for wheel of the present invention, the bearing apparatus for wheel with ensured high durability by including parts with improved fatigue strength in the non-hardened portion can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a flowchart showing an overall method of manufacturing a bearing apparatus for wheel in one embodiment of the present invention.

FIG. 3 is a flowchart showing an overall method of manufacturing a hub ring, in the method of manufacturing a bearing apparatus for wheel in one embodiment of the present invention.

FIG. 4 illustrates an exemplary heating pattern (temperature history provided to a steel member) in a thermal refining step in one embodiment of the present invention.

DESCRIPTION OF THE PREFERRED EMBODIMENTS

Figure 1:
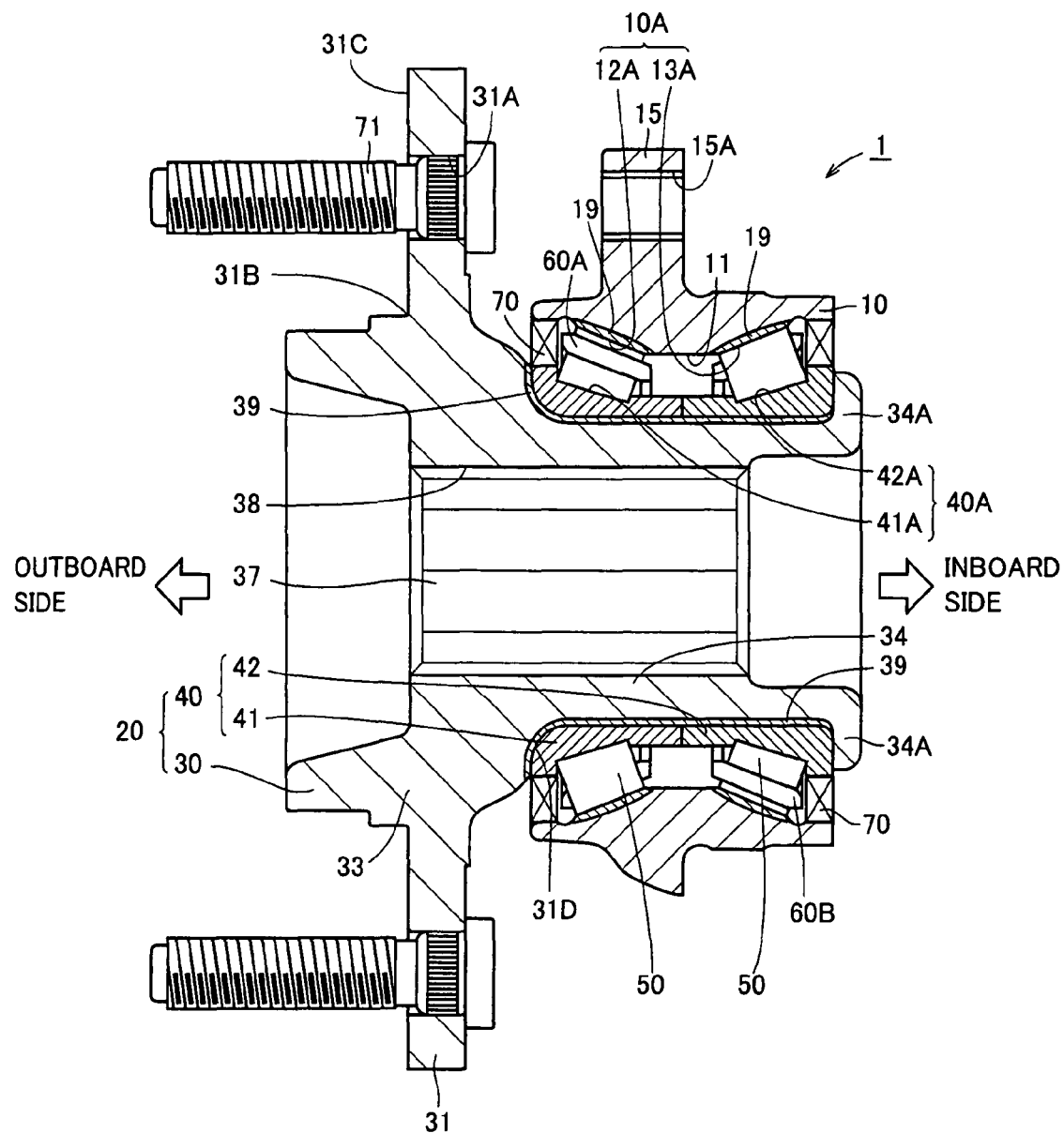
FIG. 1 is a schematic cross-sectional view showing a structure of a bearing apparatus for wheel in one embodiment of the present invention.

An embodiment of the present invention will be described hereinafter with reference to the drawings. In the drawings, the same or corresponding elements have the same reference characters allotted, and description thereof will not be repeated.

Initially, a bearing apparatus for wheel in the present embodiment will be described with reference to FIG. 1.

Referring to FIG. 1, a bearing apparatus for wheel 1 in the present embodiment includes an outer ring 10, a hub ring 30 and an inner ring 40 serving as raceway members, and a plurality of rollers 50 serving as rolling elements. Outer ring 10 implements an outer member, while hub ring 30 and inner ring 40 implement an inner member 20.

Outer ring 10 serving as the outer member is an annular raceway member having annular outer raceway surfaces 10A formed in two rows on an inner circumferential surface 11. Outer raceway surface 10A includes a first outer raceway surface 12A and a second outer raceway surface 13A. Outer ring 10 is made, for example, of S53C under JIS, (Japanese Industrial Standard), which is steel. In outer ring 10, a region including first outer raceway surface 12A and a region including second outer raceway surface 13A are quench hardened, for example, using induction hardening, so as to form a hardened portion 19 having hardness of at least 50 HRC, and preferably of at least 58 HRC.

Meanwhile, hub ring 30 serving as the inner member is a raceway member arranged in a manner partially surrounded by outer ring 10. Inner ring 40 serving as the inner member includes an annular first inner ring 41 fitted outside a small diameter portion 34 smaller in an outer diameter than a wheel attachment flange 31 in hub ring 30 and an annular second inner ring 42 arranged next to first inner ring 41 around the identical central axis and fitted outside small diameter portion 34.

First inner ring 41 is an outboard-side inner ring which is inner ring 40 closer to wheel attachment flange 31 out of first inner ring 41 and second inner ring 42 constituting inner ring 40. Second inner ring 42 is an inboard-side inner ring which is inner ring 40 farther from wheel attachment flange 31 out of first inner ring 41 and second inner ring 42 constituting inner ring 40. An outer diameter of a region of small diameter portion 34 of hub ring 30 where inner ring 40 is fitted is greater than the inner diameter of first inner ring 41, for example, by at least 50 μm to at most 80 μm, and greater than the inner diameter of second inner ring 42, for example, by at least 30 cm to at most 60 μm. Namely, the allowance of interference fit between first inner ring 41 and hub ring 30 is in a range from at least 50 μm to at most 80 μm, and the allowance of interference fit between second inner ring 42 and hub ring 30 is in a range from at least 30 μm to at most 60 μm. In addition, the allowance of interference fit between first inner ring 41 and hub ring 30 is greater than the allowance of interference fit between second inner ring 42 and hub ring 30. Thus, occurrence of creep between inner ring 40 and hub ring 30 on the outboard side is suppressed and durability of bearing apparatus for wheel 1 is improved.

Small diameter portion 34 of hub ring 30 has a cylindrical shape. An inboard-side end portion which is the end portion opposite to where flange 31 is formed when viewed from first inner ring 41 and second inner ring 42 undergoes plastic deformation in a radially outward direction, to form a caulking portion 34A. Caulking portion 34A fixes first inner ring 41 and second inner ring 42 to hub ring 30 in a direction of axis. Here, the inboard-side end portion refers to a region that should plastically deform as a result of caulking for forming caulking portion 34A.

First inner ring 41 and second inner ring 42 are formed, for example, of high-carbon chromium bearing steel under JIS (SUJ2 or the like), which is steel, and they are quench hardened in their entirety to attain a hardness in a range from at least 58 HRC to at most 64 HRC. In addition, a first inner raceway surface 41A and a second inner raceway surface 42A each implementing an inner raceway surface 40A are formed on an outer circumferential surface of first inner ring 41 and second inner ring 42. First inner raceway surface 41A and second inner raceway surface 42A are opposed to first outer raceway surface 12A and second outer raceway surface 13A respectively. It is noted that a member made of carburized steel (for example, SCr420 or SCM420 under JIS) and having its surface, in particular raceway surface 40A and the inner circumferential surface, hardened to a hardness in a range from at least 58 HRC to at most 64 HRC through carburizing quenching or carbonitriding quenching, may be adopted for inner ring 40.

Meanwhile, hub ring 30 is formed, for example, of S53C under JIS, which is steel. In hub ring 30, a region including the surface of small diameter portion 34 in contact with inner ring 40 is quench hardened through induction hardening or the like, to form a hardened portion 39 having a hardness of at least 50 HRC, preferably a hardness in a range from at least 54 HRC to at most 64 HRC, and more preferably in a range from at least 58 HRC to at most 64 HRC.

In addition, in hub ring 30 serving as the flanged member for wheel, an insertion hole 38 for insertion of another member such as a shaft is formed in a region including a central axis of a raceway of roller 50, in a manner penetrating the hub ring in the direction of axis. A plurality of grooves extending in the direction of axis are formed on the surface of the sidewall of insertion hole 38 (inner circumferential surface of hub ring 30). Consequently, the sidewall of insertion hole 38 implements a serration portion 37.

A plurality of rollers 50 are arranged in a freely rolling manner on annular raceways in multiple rows (two rows), i.e., a row where rollers 50 are in contact with first outer raceway surface 12A of outer ring 10 and first inner raceway surface 41A of first inner ring 41 and arranged at a prescribed pitch in a circumferential direction by means of an annular cage 60A, and a row where rollers 50 are in contact with second outer raceway surface 13A of outer ring 10 and second inner raceway surface 42A of second inner ring 42 and arranged at a prescribed pitch in a circumferential direction by means of an annular cage 60B.

In addition, a sealing member 70 is arranged between opposing end portions in the axial direction of outer ring 10 and end portions of first inner ring 41 and second inner ring 42 opposed thereto. Thus, leakage of lubricating grease sealed in a space between outer ring 10 and first and second inner rings 41 and 42 as well as introduction of dust or the like from the outside into the space are prevented.

According to the structure above, outer ring 10, and hub ring 30 and inner ring 40 can rotate relative to each other.

Moreover, a hub ring bolt hole 31A is formed in wheel attachment flange 31 of hub ring 30. A bolt 71 inserted in hub ring bolt hole 31A fixes wheel attachment flange 31 and a wheel (not shown) to each other. On the other hand, outer ring 10 has an outer ring flange 15 where an outer ring penetration hole 15A is formed. A not-shown bolt inserted in outer ring penetration hole 15A fixes outer ring flange 15 and a suspension (not shown) fixed to the car body to each other. According to the structure above, bearing apparatus for wheel 1, interposed between the wheel and the car body, rotatably supports the wheel to the car body.

Namely, bearing apparatus for wheel 1 in the present embodiment includes outer ring 10 serving as the outer member having annular outer raceway surfaces 10A formed in multiple rows on inner circumferential surface 11, inner member 20 having annular inner raceway surfaces 40A opposing outer raceway surfaces 10A formed in multiple rows, and roller 50 serving as the rolling element in contact with outer raceway surface 10A and inner raceway surface 40A and arranged on the annular raceway in a freely rolling manner.

Inner member 20 includes hub ring 30 serving as the flanged member for wheel, that is made of steel and has wheel attachment flange 31 formed, wheel attachment flange 31 being a flange for attaching a wheel (not shown). Hub ring 30 has hardened portion 39 hardened to attain at least 50 HRC as a result of quench hardening and a non-hardened portion 33 which is the portion other than hardened portion 39. The steel composing non-hardened portion 33 has austenite grain size of at least No. 8.

According to bearing apparatus for wheel 1 in the present embodiment, the steel composing non-hardened portion 33 of hub ring 30 serving as the flanged member for wheel has austenite grain size of at least No. 8, so that the microstructure of the steel is made finer and the fatigue strength of non-hardened portion 33 is improved. Consequently, high durability of bearing apparatus for wheel 1 in the present embodiment is ensured by including the flanged member with improved fatigue strength in non-hardened portion 33. In order to ensure further higher durability, the steel composing non-hardened portion 33 preferably has austenite grain size of at least No. 10.

Here, the austenite grain size of the steel refers to the grain size number determined by a test method defined under JIS G0551, and refers to what is called a grain size number of prior austenite.

If the grain size number is lower than No. 8, the fatigue strength is not necessarily sufficient, considering the stress generally imposed on the flanged member for wheel. Therefore, the grain size number is preferably not lower than No. 8. On the other hand, if the grain size number is greater than No. 12, hardenability may lower. Therefore, the grain size number is preferably not greater than No: 12.

The condition of the austenite grain size of the steel of not lower than No. 8 can be determined as satisfied, for example, if the grain size is not lower than No. 8 at all of three locations in the non-hardened portion tested in accordance with the method defined under JIS G0551.

Bearing apparatus for wheel 1 in the present embodiment includes outer ring 10 having annular outer raceway surfaces 10A formed in multiple rows on inner circumferential surface 11, inner member 20 having annular inner raceway surfaces 40A opposing outer raceway surfaces 10A formed in multiple rows, and roller 50 serving as the rolling element in contact with outer raceway surface 10A and inner raceway surface 40A and arranged on the annular raceway in a freely rolling manner.

Inner member 20 includes hub ring 30 serving as the flanged member for wheel, that is made of steel and has wheel attachment flange 31 formed, wheel attachment flange 31 being a flange for attaching a wheel (not shown). Hub ring 30 has hardened portion 39 hardened to attain at least 50 HRC as a result of quench hardening and non-hardened portion 33 which is the portion other than hardened portion 39. The steel composing non-hardened portion 33 has a ratio of area occupied by ferrite of not higher than 3%.

According to bearing apparatus for wheel 1 in the present embodiment, the steel composing non-hardened portion 33 of hub ring 30 serving as the flanged member for wheel has a ratio of area occupied by ferrite of not higher than 3%. Accordingly, presence of ferrite that is low in strength and tends to be an origin of crack attributed to repeatedly applied stress or a propagation path of the crack is suppressed and fatigue strength of non-hardened portion 33 is improved. Consequently, high durability of bearing apparatus for wheel 1 in the present embodiment is ensured by including the flanged member with improved fatigue strength in non-hardened portion 33.

Here, if the ratio of area occupied by ferrite exceeds 3%, ferrite phase is coupled to adjacent another ferrite phase, and it is more likely that ferrite becomes an origin of crack or a propagation path thereof. Therefore, the ratio of area occupied by ferrite is preferably not higher than 3%.

The ratio of area occupied by ferrite refers to a ratio of area of ferrite in a cut surface of the non-hardened portion of the flanged member for wheel constituting the bearing apparatus for wheel, with respect to the entire cut surface. More specifically, the ratio of area occupied by ferrite can be measured as follows. Initially, a test sample is cut from the non-hardened portion of the flanged member for wheel. After the surface of the test sample is polished, the surface is corroded with an etchant such as picral (picric acid alcohol solution). Thereafter, the corroded surface is observed, for example, with an optical microscope in three fields of view of 1 mm×1 mm (=1 mm$^2$), to calculate the average of the ratio of area occupied by ferrite with respect to the total area.

In addition, the ratio of area occupied by ferrite that may be an origin of crack or a propagation path of the crack is preferably small and desirably 0. Namely, no ferrite is desirably observed in observation of three fields of view in the measurement method above.

Bearing apparatus for wheel 1 in the present embodiment includes outer ring 10 having annular outer raceway surfaces 10A formed in multiple rows on inner circumferential surface 11, inner member 20 having annular inner raceway surfaces 40A opposing outer raceway surfaces 10A formed in multiple rows, and roller 50 serving as the rolling element in contact with outer raceway surface 10A and inner raceway surface 40A and arranged on the annular raceway in a freely rolling manner.

Inner member 20 includes hub ring 30 serving as the flanged member for wheel, that is made of steel and has wheel attachment flange 31 formed, wheel attachment flange 31 being a flange for attaching a wheel (not shown). Hub ring 30 has hardened portion 39 hardened to attain at least 50 HRC as a result of quench hardening and non-hardened portion 33 which is the portion other than hardened portion 39. The steel composing non-hardened portion 33 has a ratio of area occupied by carbide of not higher than 10%.

According to bearing apparatus for wheel 1 in the present embodiment, the steel composing non-hardened portion 33 of hub ring 30 serving as the flanged member for wheel has a ratio of area occupied by carbide of not higher than 10%. Accordingly, the structure of the steel composing non-hardened portion 33 is homogenous and fatigue strength of non-hardened portion 33 is improved. Consequently, high durability of bearing apparatus for wheel 1 in the present embodiment is ensured by including the flanged member with improved fatigue strength in non-hardened portion 33.

Here, if the ratio of area occupied by carbide exceeds 10%, tendency of lowering in fatigue strength due to lower homogeneity of the steel composing non-hardened portion 33 is more significant. Therefore, the ratio of area occupied by carbide is preferably not higher than 10%.

The ratio of area occupied by carbide refers to a ratio of area of carbide (cementite; $Fe_3C$) having a size large enough to make the steel structure inhomogeneous to such an extent as lowering fatigue strength and allowing observation with a general optical microscope, more specifically, having a diameter or a width greater than 1 μm, among carbides in the cut surface of the non-hardened portion of the flanged member for wheel constituting the bearing apparatus for wheel, with respect to the entire cut surface. For example, the ratio of area occupied by carbide can be measured as follows. Initially, a test sample is cut from the non-hardened portion of the flanged member for wheel. After the surface of the test sample is polished, the surface is corroded with an etchant such as picral. Thereafter, the corroded surface is observed, for example, with an optical microscope in three fields of view of 1 mm×1 mm (=1 $mm^2$), to calculate the average of the ratio of area occupied by carbide with respect to the total area.

In addition, the ratio of area occupied by carbide lowering fatigue strength is preferably small and desirably 0. Namely, no carbide is desirably observed in observation of three fields of view in the measurement method above.

Bearing apparatus for wheel 1 in the present embodiment includes outer ring 10 having annular outer raceway surfaces 10A formed in multiple rows on inner circumferential surface 11, inner member 20 having annular inner raceway surfaces 40A opposing outer raceway surfaces 10A formed in multiple rows, and roller 50 serving as the rolling element in contact with outer raceway surface 10A and inner raceway surface 40A and arranged on the annular raceway in a freely rolling manner.

Inner member 20 includes hub ring 30 serving as the flanged member for wheel, that is made of steel and has wheel attachment flange 31 formed, wheel attachment flange 31 being a flange for attaching a wheel (not shown). Hub ring 30 has hardened portion 39 hardened to attain at least 50 HRC as a result of quench hardening and non-hardened portion 33 which is the portion other than hardened portion 39. The content of non-diffusible hydrogen in the steel composing non-hardened portion 33 is not higher than 0.8 ppm.

According to bearing apparatus for wheel 1 in the present embodiment, the content of non-diffusible hydrogen in the steel composing non-hardened portion 33 of hub ring 30 serving as the flanged member for wheel is suppressed to 0.8 ppm or lower. Accordingly, presence of hydrogen that may promote generation and propagation of crack is suppressed and the fatigue strength of non-hardened portion 33 is improved. Consequently, high durability of bearing apparatus for wheel 1 in the present embodiment is ensured by including the flanged member with improved fatigue strength in non-hardened portion 33.

Here, if the content of non-diffusible hydrogen exceeds 0.8 ppm, it is more likely that generation and propagation of crack tends to be promoted. Therefore, the content of non-diffusible hydrogen is preferably not higher than 0.8 ppm.

The content of non-diffusible hydrogen in the steel composing non-hardened portion 33 can be determined, for example, as follows. Specifically, the content of hydrogen can be determined, for example, with a DH-103 hydrogen analyzer manufactured by LECO. Specifications of the DH-103 hydrogen analyzer manufactured by LECO are as shown below.

Range of analysis: 0.01 to 50.00 ppm
Accuracy in analysis: ±0.1 ppm or ±3% H (any higher one)
Sensitivity in analysis: 0.01 ppm
Detection method: Heat conductivity method
Sample mass size: 10 mg to 35 g (maximum: diameter 12 mm×length 100 mm)
Heating furnace temperature range: 50° C. to 1100° C.
Reagent: Anhydron $Mg(ClO_4)_2$, Ascarite NaOH
Carrier gas: Nitrogen gas, Gas dosing gas: Hydrogen gas; both gases having purity of at least 99.99% and pressure of 40PSI (2.8 $kgf/cm^2$)

Overall measurement procedure is as follows. The sample taken with a dedicated sampler is inserted in the hydrogen analyzer, in a state contained in the sampler. Diffusible hydrogen inside is guided to a heat conductivity detector by means of nitrogen carrier gas. In the present embodiment, diffusible hydrogen is not measured. Thereafter, the sample is taken out of the sampler and heated in a resistance heating furnace, so as to guide non-diffusible hydrogen by means of the nitrogen carrier gas. By measuring heat conductivity with the heat conductivity detector, the content of non-diffusible hydrogen can be found.

In order to further improve fatigue strength, the content of non-diffusible hydrogen is preferably not higher than 0.5 ppm.

The region of hub ring 30 in the present embodiment that extends from the surface of serration portion 37 by at least 1 mm is preferably formed as non-hardened portion 33 satisfying at least one of the condition of austenite grain size, the condition of the ratio of area occupied by ferrite, the condition of the ratio of area occupied by carbide, and the condition of the content of non-diffusible hydrogen described above.

Thus, the fatigue strength around the surface of the sidewall of insertion hole 38, that is, serration portion 37, is improved, and failure from serration portion 37 can be suppressed.

Considering general magnitude of the stress applied from another member to the flanged member for wheel and stress distribution in the flanged member for wheel, a region with high fatigue strength that extends by 1 mm from the surface of the sidewall of the insertion hole will suffice. Therefore, preferably, the region extending from the surface by at least 1 mm satisfies the condition above.

Bearing apparatus for wheel 1 in the present embodiment includes outer ring 10 having annular outer raceway surfaces 10A formed in multiple rows on inner circumferential surface 1, inner member 20 having annular inner raceway surfaces 40A opposing outer raceway surfaces 10A formed in multiple rows, and roller 50 serving as the rolling element in contact with outer raceway surface 10A and inner raceway surface 40A and arranged on the annular raceway in a freely rolling manner.

Inner member 20 includes hub ring 30 serving as the flanged member for wheel, that is made of steel and has wheel attachment flange 31 formed, wheel attachment flange 31 being a flange for attaching a wheel (not shown). Hub ring 30 has hardened portion 39 hardened to attain at least 50 HRC as a result of quench hardening and non-hardened portion 33 which is the portion other than hardened portion 39. Compressive stress in a range from at least 50 MPa to at most 500 MPa remains in the surface of non-hardened portion 33.

According to bearing apparatus for wheel 1 in the present embodiment, compressive stress in a range from at least 50 MPa to at most 500 MPa remains in the surface of non-hardened portion 33 of hub ring 30 serving as the flanged member for wheel. Accordingly, generation of crack in the surface of non-hardened portion 33 and subsequent propagation thereof is suppressed and the fatigue strength of non-hardened portion 33 is improved. Therefore, even if moment load is repeatedly applied to the flange for wheel from a tire, generation of crack from non-hardened portion 33 is suppressed and occurrence of fretting damage is suppressed. Consequently, high durability of bearing apparatus for wheel 1 in the present embodiment is ensured by including the flanged member with improved fatigue strength in non-hardened portion 33.

Here, if the compressive stress that remains in the surface is smaller than 50 MPa, an effect of improvement in fatigue strength and an effect of suppression of occurrence of fretting damage are not great, and hence compressive stress of at least 50 MPa is necessary. In order to further improve fatigue strength and further suppress occurrence of fretting damage, compressive stress that remains in the surface is preferably not smaller than 100 MPa. On the other hand, if compressive stress that remains in the surface exceeds 500 MPa, other outcomes brought about by providing compressive stress, such as work-hardening, become significant, and crack is likely. Therefore, compressive stress is preferably not greater than 500 MPa.

It is noted that compressive stress can be determined by measuring, with an X-ray stress measurement apparatus, compressive stress in a region below the surface of non-hardened portion 33 by 50 μm, in a direction in which stress applied in non-hardened portion 33 is greatest, for example, in the direction of axis.

Serration portion 37 of hub ring 30 in the present embodiment is preferably formed as non-hardened portion 33 that satisfies the condition of stress described above. Namely, the sidewall of insertion hole 38 is preferably included in non-hardened portion 33 that satisfies the condition of stress described above. Thus, fatigue strength around the surface of the sidewall of insertion hole 38 is improved and failure from serration portion 37 can be suppressed.

In addition, in hub ring 30 in the present embodiment, a root portion 31B of wheel attachment flange 31 on a side where the wheel is attached (outboard side) when viewed from wheel attachment flange 31 has a surface hardness of at most 35 HRC. Thus, workability in cutting or the like is improved and deformation due to heat treatment can be suppressed, and lowering in surface runout accuracy of a brake rotor attachment surface 31C of wheel attachment flange 31 caused by deformation due to heat treatment is suppressed.

In hub ring 30 in the present embodiment, an inboard-side end portion which is an end portion of hub ring 30 opposite (inboard side) to where the wheel is attached (outboard side) when viewed from wheel attachment flange 31 forms caulking portion 34A as a result of its plastic deformation in a radially outward direction. Inner ring 40 is fixed to hub ring 30 in a direction of axis by caulking portion 34A.

Thus, what is called a self-retaining structure is achieved. Therefore, as it is not necessary to control a pre-load amount by firm fastening by means of a nut or the like as in the conventional example, incorporation in the vehicle can be simplified and the pre-load amount can be maintained for a long time.

In hub ring 30 in the present embodiment, caulking portion 34A is formed as a result of plastic deformation of the inboard-side end portion having a surface hardness of at most 25 HRC. Thus, variation in hardness of caulking portion 34A is suppressed. In addition, as sufficient workability can be ensured, generation of small crack in the surface of caulking portion 34A due to plastic working can be suppressed and reliability of bearing apparatus for wheel 1 is improved.

In hub ring 30 in the present embodiment, a root portion 31D of wheel attachment flange 31 opposite (inboard side) to where the wheel is attached (outboard side) when viewed from wheel attachment flange 31 has R formed and has a surface hardness in a range from at least 54 HRC to at most 64 HRC.

Thus, sufficient mechanical strength against the rotating bending load applied to wheel attachment flange 31 can be provided, and strength and durability of hub ring 30 are further improved.

Here, the root portion of wheel attachment flange 31 refers to a base portion where wheel attachment flange 31 projects, in a cross-section including the central axis of the raceway of roller 50 serving as the rolling element, in a direction intersecting the central axis, and refers to a region where the surface of the flange is normally curved, a region where what is called R is formed, or a region where a beveled portion is formed.

In addition, the steel composing hub ring 30 in the present embodiment is a medium-carbon steel containing carbon in a range from at least 0.40 mass % to at most 0.80 mass %. Thus, ease in forging, ease in cutting, ease in heat treatment, or cost efficiency is improved, and hub ring 30 is particularly suitable for partial quench hardening using induction hardening.

A method of manufacturing bearing apparatus for wheel 1 in the present embodiment will now be described.

Referring to FIG. 2, the method of manufacturing bearing apparatus for wheel 1 in the present invention includes an outer member preparing step, an inner member preparing step, a rolling element preparing step, and an assembling step. In the outer member preparing step, referring to FIG. 1, outer ring 10 having annular outer raceway surfaces 10A formed in multiple rows on inner circumferential surface 11 is prepared. In the inner member preparing step, hub ring 30 and inner ring 40 constituting inner member 20 having annular inner raceway surfaces 40A formed in multiple rows are prepared. In the rolling element preparing step, roller 50 serving as the rolling element is prepared.

In the assembling step, initially, outer ring 10, inner ring 40 and roller 50 are combined such that inner raceway surface 40A is opposed to outer raceway surface 10A, and roller 50 is arranged on the annular raceway in a manner in contact with outer raceway surface 10A and inner raceway surface 40A. Then, a space lying between outer ring 10 and inner ring 40 (bearing space) is filled with a lubricant such as lubricating grease, and thereafter sealing member 70 is press-fitted between the opposing end portions of inner circumferential surface 11 of outer ring 10 and the end portions of first inner ring 41 and second inner ring 42 opposed to the opposing end portions, so that the lubricant is sealed in the bearing space. Thereafter, inner ring 40 of the assembly assembled as described above is press-fitted into hub ring 30 manufactured in a hub ring manufacturing step (FIG. 3) which will be described later. Thereafter, the inboard-side end portion which is the end portion of hub ring 30 plastically deforms in a radially outward direction so as to form caulking portion 34A, and caulking portion 34A fixes inner ring 40 to hub ring 30 in the direction of axis. Thus, assembly of bearing apparatus for wheel 1 is completed.

Any one of the outer member preparing step and the inner member preparing step includes a flanged-member-for-wheel manufacturing step of manufacturing the flanged member for wheel, that is made of steel and has the wheel attachment flange formed, the flanged member for wheel being a flange for attaching the wheel. More specifically, in the present embodiment, the inner member preparing step includes a hub ring manufacturing step as the inner member preparing step in which hub ring 30 serving as the flanged member for wheel is manufactured.

Referring to FIG. 3, the hub ring manufacturing step as the flanged-member-for-wheel manufacturing step includes a steel product preparing step, a hot forging step as a hot working step, a thermal refining step, a turning step, a bolt hole forming step, an induction heat treatment step as a partial quench hardening step, a broaching step, and a finishing step. In the steel product preparing step, a steel product made of steel that should compose hub ring 30 serving as the flanged member for wheel, such as a steel product made of medium-carbon steel containing carbon in a range from at least 0.40 mass % to at most 0.80 mass %, is prepared. In the hot forging step, the steel product is heated, for example, to a temperature in a range from at least 1050° C. to at most 1300° C. for hot forging, so that a steel member having an overall shape of hub ring 30 shown in FIG. 1 is formed. In the thermal refining step, the steel member is thermally refined. In the turning step, a surface region including the surface of wheel attachment flange 31 and small diameter portion 34 implemented by the steel member is subjected to turning. In the bolt hole forming step, drilling or the like is performed with respect to wheel attachment flange 31, thereby forming hub ring bolt hole 31A.

In the induction heat treatment step, a part of the thermally refined steel member is quench hardened. Specifically, referring to FIG. 1, the region including the surface of small diameter portion 34 in contact with inner ring 40, which is the region other than the surface of the sidewall of insertion hole 38, is quench hardened through induction hardening, so that hardened portion 39 having a hardness not lower than 58 HRC is formed and root portion 3 ID of wheel attachment flange 31 on the inboard side has a surface hardness in a range from at least 54 HRC to at most 64 HRC. In order to satisfy such a condition for hardness, for example in the induction heat treatment step, after the induction hardening step in which induction hardening is performed, an entire tempering step in which entire hub ring 30 is tempered and/or a partial tempering step in which a part of the region subjected to induction hardening is tempered through heating using induction heating may be performed.

In the broaching step, referring to FIG. 1, a plurality of grooves extending in the direction of axis are formed in the surface of the sidewall of insertion hole 38 that has been formed in the hot working step, thereby forming serration portion 37. Thereafter, in the finishing step, finishing treatment (finishing) such as grinding of the steel member is performed and bolt 71 is press-fitted, thus completing hub ring 30 serving as the flanged member for wheel.

Details of the thermal refining step will now be described. In FIG. 4, the horizontal direction toward the right represents elapse of time and the upward direction represents increase in temperature.

Referring to FIG. 4, the thermal refining step has a quenching step and a tempering step. In the quenching step, the steel member, fabricated in the hot forging step, is heated to a temperature not lower than $A_1$ point, for example, a temperature in a range from at least 800° C. to at most 900° C., and held for at least one hour to at most three hours. Thereafter, the steel member is cooled from a temperature range not lower than $A_1$ point to a temperature not higher than Ms point, and the steel member is thus quench hardened. Cooling can be performed, for example, by immersing the steel member in the temperature range not lower than $A_1$ point in oil for quenching (oil cooling).

Thereafter, in the tempering step, the steel member that has been quench hardened is heated to a temperature lower than $A_1$ point, for example, a temperature in a range from at least 400° C. to at most 700° C., and held for at least one hour to at most three hours. Thereafter, the steel member is cooled to a room temperature and thus tempered. By adjusting the heating temperature and the time during which the steel member is held, in particular the heating temperature, the thermal refining step can be performed such that root portion 31B of wheel attachment flange 31 on the outboard side has a surface hardness not higher than 35 HRC and the inboard-side end portion of hub ring 30 has a surface hardness not higher than 25 HRC. In order to satisfy the condition for hardness of the inboard-side end portion of hub ring 30, after the tempering step for example, a local tempering step of locally tempering the inboard-side end portion of hub ring 30 by locally heating the same through induction heating using a high-frequency current may further be performed.

It is noted that cooling in the tempering step may be performed by letting the steel member stand in air at a room temperature (air cooling) or by pouring a coolant water over the steel member as necessary (shower cooling).

The thermal refining step is performed as described above, so that the steel composing the steel member comes to have a tempered martensite (tempered troostite and/or tempered sorbite) structure. Referring to FIG. 1, such a structure is retained in non-hardened portion 33 representing the region other than hardened portion 39 which is the region to be quench hardened in the subsequent induction hardening step. Therefore, a homogenous structure where substantially no ferrite or carbide is present (the ratio of area occupied by ferrite is not greater than 3% and the ratio of area occupied by carbide is not greater than 10%), preferably no ferrite or carbide is present, is obtained. Consequently, hub ring 30 (inner member) serving as the flanged member for wheel in the present embodiment excellent in fatigue strength of non-hardened portion 33 can be manufactured.

In the thermal refining step above, if the heating temperature in the quenching step is lower than 800° C., solid solution state of carbide before cooling in quenching is insufficient and ferrite or carbide may remain. Therefore, the heating temperature is preferably set to 800° C. or higher. Meanwhile, if the heating temperature exceeds 900° C., the grain size of austenite before cooling in quenching becomes greater and the grain size number of austenite after quenching may be smaller than No. 8. Therefore, the heating temperature is preferably set to 900° C. or lower.

In addition, by performing the thermal refining step as described above, hydrogen that may be introduced in the steel member from an atmospheric gas containing hydrogen atoms (such as a mixture gas of carbon monoxide, carbon dioxide and hydrogen) during heating in the quenching step is emitted to the outside as a result of heating of the steel member to a temperature not lower than 400° C. in the tempering step, so that the content of non-diffusible hydrogen is reduced to 0.8 ppm or lower. Consequently, hub ring 30 (inner member) serving as the flanged member for wheel in the present embodiment excellent in fatigue strength of non-hardened portion 33 can be manufactured.

Moreover, by performing the thermal refining step as described above, the heating temperature in the quenching step is set to 900° C. or lower and the grain size number of generated austenite is held at No. 8 or higher. Consequently, hub ring 30 (inner member) serving as the flanged member for wheel in the present embodiment excellent in fatigue strength of non-hardened portion 33 can be manufactured.

Further, by performing the turning step and/or the broaching step after the thermal refining step, compressive stress in a range from at least 50 MPa to at most 500 MPa can remain in the surface of non-hardened portion 33. Consequently, hub ring 30 (inner member) serving as the flanged member for wheel in the present embodiment excellent in fatigue strength of non-hardened portion 33 can be manufactured.

As described above, according to the method of manufacturing the bearing apparatus for wheel in the present embodiment, bearing apparatus for wheel 1 in the present embodiment can be manufactured.

In the embodiment above, an example adopting a tapered roller as a rolling element has been illustrated and described, however, the rolling element that can be adopted in the bearing apparatus for wheel according to the present invention is not limited thereto, and a cylindrical roller or a ball may be adopted as the rolling element. In addition, in the embodiment above, an example in which inner ring 40 is fixed to hub ring 30 by using caulking has been described, however, inner ring 40 may be fixed to hub ring 30 by means of a fixing member such as a bolt. Moreover, in the embodiment above, an example in which hub ring 30 is implemented as a hub ring for driven wheel that includes insertion hole 38 as a penetration hole penetrating hub ring 30 in the direction of axis has been described, however, the hub ring constituting the bearing apparatus for wheel according to the present invention is not limited thereto, and a hub ring for idler wheel without a penetration hole may be adopted.

As to a material for hub ring 30, in addition to steel containing carbon in a range from at least 0.40 mass % to at most 0.80 mass % such as S53C under JIS, SAE1070 and the like may be adopted. In addition, as to a material for inner ring 40, in addition to SUJ2 under JIS for example, SUJ3, SCr420, SCM420, and the like may be adopted. Moreover, as to a material for outer ring 10, in addition to S53C under JIS for example, SAE1070 and the like may be adopted. Further, as to a material for roller 50, in addition to SUJ2 under JIS for example, SUJ3, SCr420, SCM420, and the like may be adopted.

The bearing apparatus for wheel according to the present invention can particularly advantageously be applied to a bearing apparatus for wheel in which high durability is required in order to rotatably support the wheel with respect to the body of an automobile or the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A bearing apparatus for a wheel, comprising:
    an outer member having multiple rows of annular outer raceway surfaces on an inner circumferential surface;
    an inner member having multiple rows of annular inner raceway surfaces opposing said outer raceway surfaces; and
    a rolling element in freely rolling contact with said outer raceway surface and said inner raceway surface;
    said inner member including a flanged member that is made of steel and has a wheel attachment flange formed thereon,
    said flanged member having:
        a portion hardened to attain at least 50 HRC as a result of quench hardening,
        a non-hardened portion, and
        a residual compressive stress in a range from at least 50 MPa to at most 500 MPa remaining in a surface of said non-hardened portion as a result of a thermal refining step followed by a turning step and/or a broaching step,
    wherein:
        the thermal refining step includes a quenching step and a tempering step,
        the tempering step is performed at a temperature from at least 400° C. to at most 700° C.,
        said flanged member has an insertion hole for insertion of another member formed in a region including a central axis of a raceway of said rolling element, and
        a sidewall of said insertion hole is included in said non-hardened portion where the residual compressive stress in a range from at least 50 MPa to at most 500 MPa remains in the surface of said non-hardened portion.

2. The bearing apparatus for a wheel according to claim 1, wherein a root portion of said wheel attachment flange on a side where said wheel is attached when viewed from said wheel attachment flange has a surface hardness of at most 35 HRC.

3. The bearing apparatus for a wheel according to claim 1, wherein
    said inner member includes:
    a hub ring serving as said flanged member, and
    an inner ring fitted onto said hub ring.

4. The bearing apparatus for a wheel according to claim 3, wherein
    an inboard-side end portion representing an end portion of said hub ring opposite to where said wheel is attached, when viewed from said wheel attachment flange, forms a caulking portion as a result of plastic deformation in a radially outward direction, and
    said inner ring is fixed to said hub ring in an axial direction thereof by said caulking portion.

5. The bearing apparatus for a wheel according to claim 4, wherein said caulking portion is formed as a result of plastic deformation of said inboard-side end portion having a surface hardness of at most 25 HRC.

6. The bearing apparatus for a wheel according to claim 3, wherein
    a pair of inner rings is fitted onto said hub ring by interference fit, and
    allowance of interference fit between said hub ring and an outboard-side inner ring which is the inner ring closer to said wheel attachment flange out of said pair of inner rings is greater than allowance of interference fit between said hub ring and an inboard-side inner ring which is the inner ring farther from said wheel attachment flange out of said pair of inner rings.

7. The bearing apparatus for a wheel according to claim 1, wherein a root portion of said wheel attachment flange opposite to where said wheel is attached when viewed from said wheel attachment flange has a surface hardness in a range from at least 54 HRC to at most 64 HRC.

8. The bearing apparatus for a wheel according to claim 1, wherein said steel is a medium-carbon steel containing carbon in a range from at least 0.40 mass % to at most 0.80 mass %.

* * * * *